United States Patent [19]

Horning

[11] 3,929,704
[45] Dec. 30, 1975

[54] SILICONE PRESSURE SENSITIVE ADHESIVES AND TAPES
[75] Inventor: Albert Emerson Horning, Troy, N.Y.
[73] Assignee: General Electric Company, Waterford, N.Y.
[22] Filed: June 7, 1973
[21] Appl. No.: 367,960

[52] U.S. Cl. 260/29.1 SB; 260/31.8 S; 260/33.6 SB; 260/825; 427/207; 428/447
[51] Int. Cl.² ... C08K 5/01; C08K 5/12; C08K 5/54; C08L 83/04
[58] Field of Search ......... 260/31.8 S, 33.6 SB, 825; 117/122 PS; 161/206

[56] References Cited
UNITED STATES PATENTS

| | | | |
|---|---|---|---|
| 2,736,721 | 2/1956 | Dexter | 117/122 PS |
| 2,814,601 | 11/1957 | Currie et al. | 117/122 PS |
| 2,854,698 | 10/1958 | Youngs | 117/122 PS |
| 2,857,356 | 10/1958 | Goodwin | 117/122 PS |
| 3,146,799 | 9/1964 | Fekete | 117/122 PS |
| 3,523,056 | 8/1970 | Horning | 161/206 |
| 3,791,998 | 2/1974 | Bruns | 260/31.8 S |

*Primary Examiner*—Allan Lieberman
*Attorney, Agent, or Firm*—John L. Young, Esq.; E. Philip Koltos, Esq.; Edward A. Hedman, Esq.

[57] ABSTRACT

A pressure-sensitive adhesive composition comprising a silicone resin, a silicone gum and a curing agent therefor, the curing agent comprising 2,4-dichlorobenzoyl peroxide in admixture with a plasticizer and an extender therefor, the extender comprising an alkylarylsiloxane or an alkylaralkylsiloxane fluid. Tapes made by coating a coherent unitary backing with the cured composition exhibit superior peel strengths.

20 Claims, No Drawings

SILICONE PRESSURE SENSITIVE ADHESIVES AND TAPES

This invention relates to silicone pressure-sensitive adhesive compositions and to tapes prepared therefrom. More particularly, it relates to compositions of silicone resins, silicone gums and an extended, plasticized peroxide-based curing agent therefore, having enhanced adhesive strength, and to tapes comprising a coherent unitary backing and a cured coating of such compositions.

BACKGROUND OF THE INVENTION

Silicone-based pressure-sensitive adhesives have many and varied uses because of their excellent resistance to high temperatures and electrical insulating properties. One important use is in the formation of pressure-sensitive tapes which can be made up into rolls and sheets and later wound around and fixed to irregularly shaped conductors, such as bus bars and the like, to provide electrical insulation. The technology of pressure-sensitive silicone adhesives and tapes is described in Goodwin, Jr., U.S. Pat. No. 2,857,356, assigned to the assignee of the present application. Such adhesives can also be used as important components in stretchable glass fabric-polyimide laminate tapes of the type described in Horning, U.S. Pat. No. 3,523,056, also assigned to the assignee of the present application.

In general, the pressure-sensitive adhesives are well known in the art and are described, for example, in Dexter, U.S. Pat. No. 2,736,721; Currie et al, U.S. Pat. No. 2,814,601 and Goodwin, cited above. They will preferably comprise a mixture of a siloxane resin, a siloxane gum and an agent for accelerating the curing of the composition by heating. Generally speaking, it is preferable to employ a solvent as a carrier for the adhesive and to heat the composition first to drive off the solvent and then to cure the adhesive to a cohesive pressure-sensitive layer.

As curing agents, it has been conventional up until now to use a peroxide, such as benzoyl peroxide, but this has its limitations, because, although the peel strength conferred by the cured adhesive is generally good, peroxides in general, and benzoyl peroxide in particular, are not too safe to handle and mix.

One advance in the art has been to substitute 2,4-dichlorobenzoyl peroxide for benzoyl peroxide, and to use this in a paste form — softened or plasticized, e.g., with a diester fluid, and extended with a methyl siloxane fluid. This curing agent, although much more safe to store, handle and mix than benzoyl peroxide, has not been universally acceptable because it confers lower peel strength, even though the cohesive strength is good.

It has now been discovered that if the formulation is changed only in the extender portion of the curing agent component of the composition, there will be a very measurable improvement in peel strength. The change in formulation consists in substitution of an alkylarylsiloxane or an alkylaralkylsiloxane fluid for a wholly dimethylsiloxane fluid. On an equivalent active peroxide solids basis, the composition according to this invention provides at least equal and generally superior peel strengths in comparison with those presently used.

DESCRIPTION OF THE INVENTION

In accordance with the present invention, there are provided pressure-sensitive adhesive compositions comprising a silicone resin, a silicone gum and a catalytic amount of a curing agent therefor, said curing agent comprising 2,4-dichlorobenzoyl peroxide, a plasticizer therefor and an extender therefor, said extender comprising an alkylarylsiloxane or an alkylaralkylsiloxane fluid.

Another important aspect of this invention is to provide pressure-sensitive tapes comprising a coherent unitary backing and a pressure-sensitive adhesive applied to a surface of said backing, said adhesive comprising the siloxane product of heat intercondensation of a silicone resin, a silicone gum and a catalytic amount of a curing agent therefor, said curing agent comprising 2,4-dichlorobenzoyl peroxide, a plasticizer therefor and an extender therefor, said extender comprising an alkylarylsiloxane or an alkylaralkylsiloxane fluid.

The curing agent for the present compositions comprises 2,4-dichlorobenzoyl peroxide, (which is an article of commerce) and ingredients to confer paste-like properties on said peroxide, such as a softener or plasticizer and an extender. Because of its paste-like appearance, the curing agent is easier to compound into the adhesive formulation, and is safer to handle than the peroxide per se.

The catalyst is used in conventional amounts, but generally will comprise from about 0.1 to about 2.5%., and preferably from about 0.25 to about 2.0 parts by weight per 100 parts of the combined weights of the silicone resin and the silicone gum.

The softener component can be any material conventionally used to make peroxide pastes, but preferably is a high boiling ester of low volatility, such as a dialkyl phthalate, e.g., dioctyl phthalate or dibutylphthalate.

The extender for the curing agent is the critical component. This will be a linear alkylaryl or alkylaralkyl siloxane fluid, containing at least about 3%, preferably about 10 to 75% and especially 15 to 50% of aryl-silicon or aralkyl-silicon bonds out of the total carbon-silicon linkages. More specifically, the extender will be a polymer represented by the formula

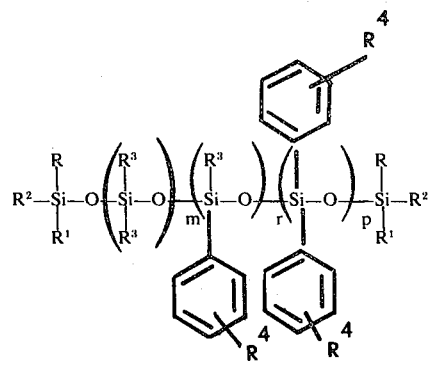

wherein R, $R^1$, $R^2$ and $R^3$ are monovalent hydrocarbon radicals and $R^4$ is hydrogen or a monovalent hydrocarbon radical and said radicals are particularly aryl radicals and halogenated aryl radicals, such as phenyl, chlorophenyl, xylyl, tolyl, and the like, and also aliphatic, haloaliphatic and cycloaliphatic radicals, e.g., alkyl, alkenyl, cycloalkyl, haloalkyl, including methyl, ethyl, propyl, chlorobutyl, cyclohexyl, trifluoropropyl; aralkyl radicals, such as phenylethyl, benzyl, and the like, and cyanoalkyl, such as cyanoethyl; and R and $R^1$ can be the same or different, and $R^2$ can include the same values as R and $R^1$ as well as hydroxyl, alkoxy, aryloxy, and the like, and the ratio of m, r and p is variable so long as the total number of groups is not less than 10% nor more than 75% of the total organic groups attached to silicon, e.g., 0/100/0, 50/0/50, 40/40/20 and the like, the units can be randomly interspersed or in blocks and the sum if $m$, $r$ and $p$ will be such that the polymers will be fluids at ambient temperatures, e.g., a viscosity of from 25 up to about $0.5 \times 10^6$ centipoises at 25°C. Preferably, the hydrocarbon groups will be methyl, phenyl, phenylethyl or hexyl. Preferably, the dimethyl units will predominate in a dimethyldiarylsiloxane copolymer and will comprise 25 to 90% of the total units. For a methylaryldimethyl copolymer, the dimethyl units may or may not predominate and preferably, the dimethyl units will comprise up to about 40% of the total number of units.

Illustrative alkylarylsiloxane fluids will comprise poly(methylphenylsiloxane); copolymers of dimethylsiloxane and diphenylsiloxane units; copolymers of dimethylsiloxane and methylphenylsiloxane units; terpolymers of dimethylsiloxane, methylvinylsiloxane units and diphenylsiloxane units, and the like. The homo- and copolymers can be blocked at the ends, e.g., with triorganosiloxy units, such as trimethylsiloxane, dimethylvinylsiloxane, dimethylphenylsiloxane units, and the like. Preferably, the organo substituents in the fluid will be selected from methyl, phenyl, ethylphenyl and hexyl groups. However, other organic radicals can also be present, such as vinyl, trifluoropropyl, ethyl, propyl, octadecyl, allyl, cyclohexenyl, naphthyl, chloromethyl, bromophenyl, and the like.

These fluids are prepared by methods which are well known and widely used. For example, a mixture of the appropriate ratio of dimethyl dichlorosilane and diphenyldichlorosilane is hydrolyzed to make a mixture of linear and cyclic prepolymers. These, or mixtures of the individual linear or cyclic prepolymers, are then equilibrated with compounds, such as disiloxanes, to provide the triorganosiloxy terminating groups. The lower the concentration of equilibration compounds, the higher the molecular weight. The fluid is washed with water, neutralized, dried and devolatilized. Detailed directions are set forth in the Encyclopedia of Polymer Science and Technology, John Wiley and Sons, New York, Vol. 12, page 522 et seq (1970).

The amount of 2,4-dichlorobenzoyl peroxide in the curing agent can vary from about 10 to about 90 and preferably from about 30 to about 70% by weight in the paste. The amount of plasticizer can vary from about 2 to about 30% by weight and preferably ranges from about 5 to about 30% by weight. The extender can make up the balance (to 100%), but preferably will range from about 10 to about 60% by weight and, especially preferably, from about 25 to about 50% by weight. In preferred pastes, the 2,4-dichlorobenzoyl peroxide will comprise about the same weight as the combined weights of plasticizer and extender. In especially preferred compositions, the extender will comprise from about an equal weight to about 5 times the weight of the plasticizer. In the most preferred compositions, the ratio of peroxide to plasticizer to extender will be about 4:1:3.

The pressure sensitive adhesives to which the curing agent is added are well known in the art and are described, for example, in the Dexter, Currie et al, Goodwin, and Horning patents above mentioned, and incorporated by reference into the present application.

One class of pressure sensitive adhesives is that of Currie et al and consists of (1) from 40 to 75 weight % of a benzene soluble resin copolymer of $SiO_2$ units and $R_3SiO_{0.5}$ units, where R is methyl, ethyl, propyl, vinyl or phenyl, at least 90% of the total R radicals being aliphatic, in which the ratio of $R_3SiO_{0.5}$ units to $SiO_2$ units is from 0.5 to 1.5, and preferably from 0.55 to 0.75, and (2) from 25 to 60 weight % of a silanol end-stopped diorganopolysiloxane gum of from 5,000 to $10^6$ centistokes viscosity at 25°C. in which the organic radicals are methyl, phenyl, ethyl, vinyl, and the like, at least 75% of the total number of radicals being aliphatic.

Such compositions are prepared by merely mixing siloxanes (1) and (2) and adding the curing catalyst. Curing the compositions can be accomplished by heating, e.g., to 120°–200°C., preferably to 160°–175°C., for a sufficient period of time to reach the desired degree of tackiness and cohesion, e.g., one-half to 6 hours.

Another class of pressure-sensitive adhesives is that of Goodwin, Jr., and consists of a mixture of ingredients comprising (1) a cohydrolysis product of a trialkyl hydrolyzable silane and alkyl silicate (either in the monomeric or polymeric state), the cohydrolysis product containing a plurality of silicon-bonded hydroxy groups, and (2) a linear, high viscosity organopolysiloxane fluid containing silicon bonded hydroxy groups. This product can be made by intercondensation at a temperature of from about 100° to 150°C. of a mixture of ingredients comprising (1) one part of a cohydrolysis product of a mixture of (a) a trialkyl hydrolyzable silane wherein the fourth valence of the silicon atom is attached directly to a hydrolyzable groups and (b) an alkyl silicate the alkyl groups of the silane and silicate preferably having from 1 to 4 carbon atoms and the cohydrolysis product containing a plurality of silicon-bonded hydroxyl groups, there being employed a molar ratio of from 1 to 2 mols of the alkyl silicate per mole of the trialkyl hydrolyzable silane, and (2) from 0.5 to 2 parts of a linear high viscosity organopolysiloxane gum, preferably above 200,000 centipoises viscosity, and containing terminal silicon-bonded hydroxyl groups, the organic groups being attached to silicon by carbon-silicon linkages and selected from monovalent hydrocarbon radicals and halogenated aryl radicals, there being present an average of about 2 organic groups per silicon atom in the organopolysiloxane gum, the intercondensation proceeding through the medium of the silicon-bonded hydroxyl groups of (1) and (2).

In preferred embodiments, the silicone resin, silicone gum and catalytic agent are mixed together, preferably in a solution, with a conventional solvent. Preferably, the mixture of resin, gum and catalyst are mixed together and heated e.g., at 100°–200°C. to effect interaction between the ingredients and to remove solvent present. Heating for one-half to six hours is generally sufficient to produce optimum tack and cohesive strength in the final product. This is readily determined by removing samples periodically from the interreacted mixture to establish whether a suitable level of tackiness and cohesive strength has been attained. After a material of suitable tackiness and cohesive strength has been obtained, then for the preparation of tapes, for example, the product is dissolved in a solvent such as a naphthenic or aromatic hydrocarbon, or a halogenated hydrocarbon, preferably an aromatic, naphthenic or paraffinic hydrocarbon, such as benzene, toluene, xylene, hexane, or the like, at a convenient solids content, for example, from 40 to 70% solids. This solution can then advantageously be applied to tapes, or cloths and the like, by various means, such as brushing, spraying, knife coating, etc.

The pressure-sensitive tapes, as well as sheets, etc., according to this invention, may be obtained by applying the compositions, especially preferably solvent solutions of the compositions, to various coherent unitary backings, such as paper, cloth, glass cloth, silicone rubber, silicone resin-treated glass cloth, polyethylene terephthalate sheets or tapes, polytetrafluoroethylene tapes, polychlorotrifluoroethylene tapes, polyimide film, aromatic polyamide paper etc. Generally, coatings of the order of about 0.3 to 5 mils or more thick may be employed for the purpose. In order to prevent adhesion of the pressure-sensitive adhesive to its own backing if it should be rolled up into cylinders or tapes, sheets, etc., a suitable anti-blocking or release coating or sheet may be interspersed between the surface of the pressure-sensitive adhesive and the adjacent uncoated surface of the backing for the pressure-sensitive adhesive. Those skilled in the art will be able to select appropriate anti-blocking materials, and will be well aware of the conventional details of tape manufacture.

DESCRIPTION OF THE PREFERRED EMBODIMENTS

In order that those skilled in the art may better understand how the present invention may be practiced, the following examples are given by way of illustration and not by way of limitation. All parts are by weight.

EXAMPLE 1

A silicone resin is prepared by charging 108 parts of trimethylchlorosilane, 374 parts of ethyl orthosilicate and 250 parts of toluene to a reactor and adding 144 parts of water at such a rate that the temperature is controlled between 75° to 80°C. The acid aqueous layer is drained off and the organopolysiloxane layer is treated with a sufficient amount of sodium bicarbonate to neutralize all of the hydrochloric acid, thereafter the mixture is filtered.

A silicone gum is prepared by heating 100 parts of octamethylcyclotetrasiloxane to about 140°C. and adding 0.01 part of KOH and continuing the heating until the viscosity of the reaction mixture reaches 100,000 cps. Steam is then blown across the top of the polymer until the viscosity of the polymer is reduced to about 25,000–50,000 cps. This treatment introduces a plurality of silicon-bonded hydroxy groups in the fluid. At this point, the steam passage is discontinued and while blanketing the surface of the polymer with nitrogen, the mixture is again heated at about 140°C. until the viscosity reaches about 500,000 to 1,500,000 cps. Then 0.1 part of triphenyl phosphate is intimately dispersed in the reaction product and the latter is then heated for 30 minutes to effect neutralization and render the KOH inert.

To prepare the pressure sensitive adhesive, the resin solution is heated to 100° to 125°C. to distill off the toluene and then to 120 parts of the resin is added 100 parts of gum (236,000 cps. viscosity) and the mixture is kneaded and heated at 125°C. for about 2 to 3 hours. Thereafter, xylene is added to bring the composition to the proper consistency to make tapes. The solids content of the solution is between about 55 and 65%.

To prepare the composition according to this invention, to the xylene solution is added a paste comprising 50 parts of 2,4-dichlorobenzoyl peroxide, 12.5 parts of dibutylphthalate and 37.5 parts of a methylphenyl siloxane fluid. The fluid has a viscosity of 1,000 cps. and is a copolymer containing dimethylsiloxane units and diphenylsiloxane units. The siliconphenyl linkages comprise about 35% of the total siliconhydrocarbon linkages. The amount of peroxide paste based on the 100 parts of combined silicone resin and silicone gum is 1.0, 1.5, 2.0 and 3.0 parts.

To prepare a pressure-sensitive tape according to this invention, the curable adhesive compositions are applied to a 2 mil etched polytetrafluoroethylene film and cured for 5 minutes at 155°–160°C. The build is about 2.0 to 2.3 mils. The pressure-sensitive tape has a relatively high peel strength.

EXAMPLE 2

The procedure of Example 1 is repeated, substituting for the dimethylpolysiloxane gum, 105 parts of a copolymer (720,000 cps. viscosity) made from 100 parts of octamethylcyclotetrasiloxane and 15 parts of octaphenyl-cyclotetrasiloxane with 110 parts of the resin of Example 1. Curable compositions with high cohesive strength and pressure-sensitive tapes with high peel strength are obtained.

EXAMPLE 2A

A 2 mil etched polytetrafluoroethylene film is coated on its upper surface with a silicone adhesive solution. The adhesive solution contains 450 g. of a silanol end-stopped polyorganosiloxane gum having the average formula

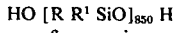

550 g. of a resinous copolymer of trimethylsiloxane units and $SiO_2$ units containing 0.75 trimethylsiloxane unit per $SiO_2$ units and a catalyst agent comprising a paste of 20 parts of 2,4-dichlorobenzoyl peroxide, 5 parts of dibutylphthalate and 15 parts of a methylphenylsiloxane fluid as described in Example 1. The composition is dissolved in 1,000 g. of benzene. In the mixture of the gum and the resin, 87% of the total number of R groups are methyl radicals and 13% of the total number of R groups are phenyl radicals randomly distributed among the available positions. The composition is applied wet, the solvent is removed at 80°–95°C. and the coated tape is transferred into a baking chamber at 125°–175°C., where it cures to a cohesive pressure-sensitive layer on the tape. The tape has a high peel strength.

EXAMPLES 3–6

Pressure-sensitive tapes according to this invention are prepared by coating 2 mil etched polytetrafluoroethylene film with a siloxane adhesive composition containing a curing agent comprising 50 parts of 2,4-dichlorobenzoyl peroxide, 12.5 parts of dibutyl phthalate and 37.5 parts of a methyl phenyl siloxane fluid as described in Example 1.

The siloxane adhesive composition comprises:

A. 50 parts resin solids of a resin copolymer based on one mole $SiO_2$ reacted with 0.5 to 0.6 moles $(CH_3)_3SiO_{1/2}$, B. 40 parts of a silanol-stopped polysiloxane copolymer of 5.3 mole percent diphenylsiloxane and 94.7 mole percent dimethylsiloxane such polymer having a viscosity in excess of 10,000 cs.

C. 10 parts of the following blend:
  i. 72 parts of a 0.2 mole percent methyl vinyl siloxane, 5.3 mole percent diphenylsiloxane, and 94.5 mole percent dimethylsiloxane such polymer having an initial viscosity of over 10,000,000 cs.,
  ii. 18 parts of a fumed silica having a surface area of over 250 m²/g,
  iii. 8.5 parts a process aid composed of 30 mole percent diphenylsiloxane and 70 percent dimethylsiloxane having a viscosity of 30 to 60 cs.,
  iv. 2.5 parts of octamethyl cyclotetrasiloxane.

The above ingredients A, B, and C are prepared in a solution of xylene at 60% overall solids content. An alkali catalyst such as NaOH is used at normally 10 to 25 ppm on total solution weight at reflux temperatures 145 to 155°C. to effect a copolymer of the resin and gums for a cook time of ½ to 6 hours.

EXAMPLES 7–10

The procedure of Examples 3–6 is repeated, substituting a different adhesive. The adhesive composition comprises:

A. 50 parts resin solids of a resin copolymer identical to that used in Example 3.

B. 38 parts of a silanol-stopped polysiloxane copolymer consisting of 5.3 mole percent diphenylsiloxane and 94.7 mole percent dimethylsiloxane, such polymer having a viscosity in excess of 10,000,000 cs., C. 12 parts of a 0.2 mole percent methylvinyl siloxane, 5.3 mole percent diphenylsiloxane, and 94.5 mole percent dimethyl siloxane such polymer having a viscosity of over 10,000,000 cps.

The above ingredients A, B and C are prepared as a solution in xylene at 55% solids content. An organic primary amine at 10 to 20 ppm on total solids content is used to catalyze the above mixture at reflux temperature (145°–155°C) for a period of ½ to 6 hours.

The results are summarized in Table 2.

Table 2

| Example | \multicolumn{11}{c}{Peel Strengths of Silicone Pressure Sensitive Tapes} |
|---|---|---|---|---|---|---|---|---|---|---|---|
|  | 7 | 8 | 9 | 10 | 7A* | 7B | 7C | 8A | 8B | 8C | 8D |
| Composition(parts by weight) silicone adhesive** | 100 | 100 | 100 | 100 | 100 | 100 | 100 | 100 | 100 | 100 | 100 |
| Curing agent |  |  |  |  |  |  |  |  |  |  |  |
| benzoyl peroxide |  |  |  |  | 1.0 | 1.5 | 2.0 |  |  |  |  |
| 2,4-dichlorobenzoyl peroxide | 0.5 | 0.75 | 1.0 | 1.5 |  |  |  | 0.5 | 0.75 | 1.0 | 1.5 |
| dibutyl phthalate | .12 | .18 | .25 | .38 |  |  |  | .13 | .18 | 0.25 | .38 |
| dimethylsiloxane fluid*** |  |  |  |  |  |  |  | .37 | 0.56 | 0.75 | 1.12 |
| methylphenylsiloxane fluid**** | .38 | 0.56 | 0.75 | 1.12 |  |  |  |  |  |  |  |
| Film characteristics |  |  |  |  |  |  |  |  |  |  |  |
| Build, mil | 2.15 | 2.05 | 2.05 | 2.30 | 2.0 | 2.05 | 2.00 | 2.10 | 2.05 | 2.35 | 2.15 |
| Peel strength, oz./in. | 44.5 | 42 | 40 | 38 | 37 | 33.5 | 34 | 42 | 39 | 37 | 33 |
| Peel strength, oz./in. | 52 | 48 | 46 | 44 | 42.5 | 41 | 39 | 47 | 43 | 40.5 | 37 |

*7A–8D, inclusive, controls and comparisons
**dimethyl phenyl vinyl polysiloxane gum, silicone resin interpolymer (see p.16, lines 4–19, above)
***Same as Example 3
****Same as Example 3

The tapes are cured for 5 minutes at 155°–160°C. and the peel strength is measured according to ASTM D-1000. For comparison purposes, the procedure is repeated, substituting solid benzoyl peroxide for the paste of 2,4-dichlorobenzoyl peroxide, and substituting a dimethylsiloxane fluid for the methyl phenylsiloxane fluid as an extender for the catalyst paste.

The results are summarized in Table 1.

EXAMPLES 11–14

The procedure of Examples 7–10 is repeated, substituting a 3.25 mil primed polytetrafluoroethylene film base. The results are summarized in Table 3.

Table 1

| Example | \multicolumn{11}{c}{Peel Strengths of Silicone Pressure Sensitive Tapes} |
|---|---|---|---|---|---|---|---|---|---|---|---|
|  | 3 | 4 | 5 | 6 | 3A* | 3B | 3C | 3D | 4D | 5D | 6D |
| Composition(parts by weight) silicone adhesive** | 100 | 100 | 100 | 100 | 100 | 100 | 100 | 100 | 100 | 100 | 100 |
| Curing agent |  |  |  |  |  |  |  |  |  |  |  |
| benzoyl peroxide |  |  |  |  | 1.0 | 1.5 | 2.0 |  |  |  |  |
| 2,4-dichlorobenzoyl peroxide | 0.5 | 0.75 | 1.0 | 1.5 |  |  |  | 0.5 | 0.75 | 1.0 | 1.5 |
| dibutyl phthalate | 0.12 | 0.18 | 0.25 | 0.38 |  |  |  | 0.12 | 0.18 | 0.25 | 0.38 |
| dimethylsiloxane fluid*** |  |  |  |  |  |  |  | 0.38 | 0.56 | 0.75 | 1.37 |
| methylphenylsiloxane fluid**** | 0.38 | 0.56 | 0.75 | 1.12 |  |  |  |  |  |  |  |
| Film characteristics |  |  |  |  |  |  |  |  |  |  |  |
| Build, mil | 2.30 | 2.25 | 2.05 | 2.05 | 2.05 | 2.25 | 2.00 | 2.35 | 2.35 | 2.35 | 2.10 |
| Peel strength, oz./in. | 45 | 44.5 | 44.5 | 40.5 | 39 | 37 | 33.5 | 42 | 41 | 37 | 33.5 |
| Peel strength, oz./in. (16 hours) | 46.5 | 46 | 46.5 | 41 | 41.5 | 38.5 | 36.5 | 42 | 41 | 38 | 35 |

*3A–6D, inclusive, controls and comparisons
**dimethyl phenyl vinyl polysiloxane gum, silicone resin interpolymer (see p.16, line 10 to p.17, line 16, above)
***dimethylpolysiloxane fluid, 1,000 cps., General Electric Company, SF-96
****methylphenylsiloxane fluid, 1,000 cps., Example 1

Table 3

Peel Strengths of Silicone Pressure Sensitive Tapes

| Example | 11 | 12 | 13 | 14 | 11A* | 11B | 11C | 11D |
|---|---|---|---|---|---|---|---|---|
| Composition (parts by weight) | | | | | | | | |
| silicone adhesive** | 100 | 100 | 100 | 100 | 100 | 100 | 100 | 100 |
| Curing agent | | | | | | | | |
| 2,4-dichlorobenzoyl peroxide | 0.5 | 1.0 | 1.5 | 2.0 | 0.5 | 1.0 | 1.5 | 2.0 |
| dibutyl phthalate | .12 | 0.25 | .38 | 0.5 | .12 | .25 | .38 | 0.5 |
| dimethylsiloxane fluid*** | | | | | .38 | 0.75 | 1.12 | 1.5 |
| methylphenylsiloxane fluid**** | .38 | 0.75 | 1.12 | 1.5 | | | | |
| Film characteristics | | | | | | | | |
| Build, mil | 2.35 | 2.30 | 2.30 | 2.35 | 2.25 | 2.30 | 2.40 | 2.40 |
| Peel strength, oz./in. | 44 | 42 | 38 | 33 | 35 | 33 | 31 | 28 |

*11A-11D, inclusive, controls
**Same as Example 7
***Same as Example 7, SF-96
****Same as Example 1

In Examples 3–14, it is demonstrated that substitution of the prior art silicone paste catalyst containing the methyl siloxane fluid gives a lowering of peel strength at 0.75% active catalyst on the silicone adhesive solids content. This amount of active catalyst is usually the minimum needed for acceptable cohesive strength. On the other hand, the methylphenyl silicone extended paste according to this invention is substantially better in peel strength performance compared to either benzoyl peroxide or to 2,4-dichlorobenzoyl peroxide extended with methyl siloxane fluid.

EXAMPLES 15–20

The procedure of Examples 3–6 is repeated, substituting for the polytetrafluoroethylene film, poly(ethylene terephthalate) films of various thickness. Comparative tests are run too, and the results are summarized in Table 4.

Table 4

Peel Strengths of Silicone Pressure Sensitive Tapes

| Example | 15 | 16 | 17 | 18 | 19 | 20 |
|---|---|---|---|---|---|---|
| Composition (parts by weight) | | | | | | |
| silicone adhesive** | | | | | | |
| Example 3 | 100 | 100 | 100 | | | |
| Example 7 | | | | 100 | 100 | 100 |
| Curing agent | | | | | | |
| 2,4-dichlorobenzoyl peroxide | 1.5 | 1.5 | 1.5 | 1.5 | 1.5 | 1.5 |
| dibutyl phthalate | .38 | .38 | .38 | .38 | .38 | .38 |
| methylphenylsiloxane fluid*** | 1.12 | 1.12 | 1.12 | 1.12 | 1.12 | 1.12 |
| Film characteristics | | | | | | |
| Base thickness, mils | 1 | 2 | 3 | 1 | 2 | 3 |
| Film build, mils | 2.6 | 2.2 | 1.75 | 2.6 | 2.5 | 2.0 |
| Peel strength, oz./in. | 44 | 66 | 72 | 42 | 59 | 63 |

| Example | 15A* | 15B | 15C | 15D | 15E | 15F |
|---|---|---|---|---|---|---|
| Composition (parts by weight) | | | | | | |
| silicone adhesive** | | | | | | |
| Example 3 | 100 | 100 | 100 | | | |
| Example 7 | | | | 100 | 100 | 100 |
| Curing agent | | | | | | |
| benzoyl peroxide | | | | | | |
| dibutyl phthalate | 1.5 | 1.5 | 1.5 | 1.5 | 1.5 | 1.5 |
| methylsiloxane fluid | | | | | | |
| Film characteristics | | | | | | |
| Base thickness, mils | 1 | 2 | 3 | 1 | 2 | 3 |
| Film build, mils | 2.6 | 2.3 | 1.7 | 2.75 | 2.5 | 2.1 |
| Peel strength, oz./in. | 37.5 | 57 | 63 | 41 | 56 | 61 |

| Example | 16A | 16B | 16C | 16D | 16E | 16F |
|---|---|---|---|---|---|---|
| Composition (parts by weight) | | | | | | |
| silicone adhesive** | | | | | | |
| Example 3 | 100 | 100 | 100 | | | |
| Example 7 | | | | 100 | 100 | 100 |
| Curing agent | | | | | | |
| 2,4-dichlorobenzoyl peroxide | 1.5 | 1.5 | 1.5 | 1.5 | 1.5 | 1.5 |
| dibutyl phthalate | .38 | .38 | .38 | .38 | .38 | .38 |
| methylsiloxane fluid*** | 1.12 | 1.12 | 1.12 | 1.12 | 1.12 | 1.12 |
| Film characteristics | | | | | | |
| Base thickness, mils | 1.0 | 2.0 | 3.0 | 1.0 | 2.0 | 3.0 |
| Film build, mils | 2.6 | 2.3 | 1.8 | 2.75 | 2.3 | 2.1 |
| Peel strength, oz./inc. | 35 | 52 | 60.5 | 38 | 50 | 58 |

*15A-16F, comparisons
**Examples 3 and 7
***Example 1

EXAMPLES 21 and 22

A composition comprising a commercial all methyl silicone adhesive (Dow Corning DC-280A) and the curing agent composition of Example 3 is prepared and coated on tetrafluoroethylene tape and cured, then the peel strength is measured. For comparison purposes, a dimethylsiloxane fluid-extended paste and solid benzoyl peroxide are substituted. The results are summarized in Table 5.

Table 5

| Peel Strengths of Silicone Pressure Sensitive Tapes | | | | |
|---|---|---|---|---|
| Example | 21 | 22 | 1A* | 21B* |
| Composition(parts by weight) | | | | |
| silicone adhesive** | 100 | 100 | 100 | 100 |
| Curing agent | | | | |
| benzoyl peroxide | | | 2.0 | |
| 2,4-dichlorobenzoyl peroxide | 0.5 | 1.5 | | 1.5 |
| dibutyl phthalate | .12 | .38 | | .38 |
| dimethylsiloxane fluid*** | | | | 1.38 |
| methylphenylsiloxane fluid**** | .38 | 1.12 | | |
| Film characteristics | | | | |
| Build, mil | 2.2 | 1.95 | 2.4 | 2.3 |
| Peel strength, oz./in. | 40 | 38 | 35 | 34 |

*Controls and comparisons
**Dow Corning all dimethylsilicone adhesive, (DC-280A)
***Same as Example 2A
****Same as Example 3

EXAMPLES 23–25

A series of catalyzed cold blend formulations of gums and resins for pressure-sensitive adhesives are prepared. Gum "A" has 5.3 mole % of diphenyldisiloxane content, remainder dimethylsiloxane. Gum "B" has 13.5 mole % diphenyldisiloxane content, remainder dimethyldisiloxane. These cold blends of resin and gum usually require more peroxide in the formulated adhesive than the copolymers of Examples 3 and 7. One of the extenders according to this invention is a silicone fluid having a polysiloxane backbone of 50 mole % dimethyl radicals, 25 mole % of phenylethyl radicals and 25 mole % of hexyl radicals (General Electric, SF-1080). Tapes are prepared from the compositions on a 2 mil. etched polytetrafluoroethylene substrate. The peel strengths are measured and the results are summarized in Table 6.

Table 6

| Peel Strengths of Silicone Pressure Sensitive Tapes | | | | | | | |
|---|---|---|---|---|---|---|---|
| Example | 23 | 24 | 25 | 23A* | 23B | 24A* | 25A* |
| Composition(parts by weight) | | | | | | | |
| silicone gum "A" | 50 | | | 50 | 50 | | |
| silicone gum "B" | | 50 | 50 | | | 50 | 50 |
| silicone resin | 50 | 50 | 50 | 50 | 50 | 50 | 50 |
| Curing agent | | | | | | | |
| benzoyl peroxide | | | | 1.8 | | 1.9 | |
| 2,4-dichlorobenzoyl peroxide | 1.9 | 1.9 | 1.9 | | 1.9 | | 1.9 |
| dibutyl phthalate | .48 | .48 | .48 | | .48 | | .48 |
| dimethylsiloxane fluid** | | | | | 1.42 | | 1.42 |
| methylphenylsiloxane fluid*** | 1.42 | 1.42 | | | | | |
| methylhexylphenylethylsiloxane fluid**** | | | 1.42 | | | | |
| Film characteristics | | | | | | | |
| Build, mil. | 2.2 | 2.2 | 2.15 | 1.95 | 2.2 | 2.2 | 2.4 |
| Peel strength, oz./in. | 53 | 49 | 64 | 39 | 34 | 59 | 22 |

*Controls and comparisons
**Same as Example 2A
***Same as Example 3
****alkylaralkylsiloxane fluid, see description above, SF-1080

The data show that the catalyst extended with all methyl silicone fluid shows even poorer performance with a cold blend adhesive formulation. As the phenyl content increases to 13 mole % diphenyldisiloxane, the all methyl fluid extended composition seriously deteriorates the ultimate peel strength values.

Experiments have shown that the alkylarylsiloxane extender fluids in the paste catalysts based on 2,4-dichlorobenzoyl peroxide, in resin-gum adhesive formulations of 100% methyl siloxanes, are limited in their benefits to improved peel strength where the methyl siloxane gum content represents no more than 50 percent of the combined dry weight of resin and gum.

The data in the above examples demonstrate that the compositions according to this invention yield a very measurable improvement in peel strength.

Obviously many variations are possible in light of the above detailed description. For example, instead of dibutyl phthalate, dioctyl phthalate can be used as a plasticizer for the catalyst paste. Instead of polytetrafluoroethylene and poly(ethylene terephthalate) the base for the pressure sensitive tape can comprise glass cloth, silicone rubber or polyethylene.

The invention has been broadly described and variations may be made without departing from the spirit and scope thereof.

I claim:

1. A pressure-sensitive adhesive composition comprising a silicone resin, a silicone gum and a catalytic amount of a curing agent therefor, said curing agent comprising from about 10 to about 90% by weight of 2,4-dichlorobenzoyl peroxide, from about 2 to about 30% by weight of a plasticizer therefor, said plasticizer being a high boiling ester of low volatility, and for the balance an extender therefor, said extender comprising an alkylaryl or an alkylaralkyl siloxane fluid containing at least about 3% of aryl-silicon or aralkyl-silicon bonds out of the total carbon-silicon linkages.

2. A composition as defined in claim 1 in which the extender for said curing agent comprises a methyl phenyl siloxane fluid wherein the phenyl-silicon linkages comprise from about 10 to about 75% of the carbon-silicon linkages.

3. A composition as defined in claim 2 in which the extender for said curing agent comprises a methyl phenyl siloxane fluid wherein the phenyl-silicon linkages comprise from about 15 to about 50% of the carbon-silicon linkages.

4. A composition as defined in claim 2 in which the extender for said curing agent comprises a methyl phenylethyl siloxane fluid wherein the phenylethyl-silicon linkages comprise from about 10 to about 75% of the carbon-silicon linkages.

5. A composition as defined in claim 1 wherein the 2,4-dichlorobenzoyl peroxide comprises from about 0.1 to about 5 parts by weight per 100 parts of the combined weights of said silicone resin and said silicone gum.

6. A composition as defined in claim 5 wherein the 2,4-dichlorobenzoyl peroxide comprises from about 0.25 to about 2.0 parts by weight per 100 parts of combined weights of said silicone resin and said silicone gum.

7. A composition as defined in claim 1 wherein said curing agent comprises 2,4-dichlorobenzoyl peroxide in admixture with said plasticizer and said extender, the relative amounts of said plasticizer and said extender being selected to provide a paste-like consistency to said curing agent.

8. A composition as defined in claim 1 wherein the plasticizer for said curing agent is a liquid ester of low volatility.

9. A composition as defined in claim 8 wherein said ester is dibutyl phthalate.

10. A composition as defined in claim 1 wherein said silicone resin and said silicone gum are an intercondensation product of a mixture of 1 part of a silicone resin having a plurality of silicon-bonded hydroxyl groups and from 0.5 to 2 parts of a silicone gum containing terminal-silicon bonded hydroxyl groups.

11. A composition as defined in claim 1 wherein said silicone resin comprises (1) a cohydrolysis product of a trialkyl hydrolyzable silane and an alkyl silicate, said cohydrolysis product containing a plurality of silicon-bonded hydroxyl groups.

12. A composition as defined in claim 11 there being employed in said silicone resin from 1 to 2 moles of the alkyl silicate per mole of trialkyl hydrolyzable silane.

13. A composition as defined in claim 1 wherein said silicone gum comprises a linear high viscosity organopolysiloxane fluid containing terminal silicon-bonded hydroxyl groups.

14. A composition as defined in claim 13, the organic groups in said silicone gum being attached to silicon by carbon-silicon linkages and being selected from the class consisting of monovalent hydrocarbon radicals and halogenated aryl radicals, there being present an average of about two organic groups per silicon atom in the organopolysiloxane gum, said gum being above 200,000 centipoises viscosity.

15. A composition as defined in claim 1 wherein said silicone resin is a copolymer of $SiO_2$ units and $R_3SiO_{0.5}$ units, where R is methyl, ethyl, propyl, vinyl or phenyl.

16. A composition as defined in claim 1 wherein said silicone gum is a silanol end-stopped diorganopolysiloxane in which the organic radicals are methyl, ethyl, vinyl or phenyl groups.

17. A composition as defined in claim 1 wherein said composition also includes a solvent as a carrier for the adhesive.

18. A composition as defined in claim 17 wherein said solvent is an aromatic, naphthene or paraffin hydrocarbon solvent.

19. A pressure-sensitive adhesive composition comprising a silicone resin, a silicone gum and a catalytic amount of a curing agent therefor, said curing agent comprising from about 10 to about 90% by weight of 2,4-dichlorobenzoyl peroxide, from about 2 to about 30% by weight of a dialkyl phthalate plasticizer therefor, said dialkyl phthalate being a high boiling ester of low volatility, and for the balance an extender therefor, said extender comprising an alkylaryl or an alkylaralkyl siloxane fluid containing at least about 3% of aryl-silicon or aralkyl-silicon bonds out of the total carbon-silicon linkages.

20. A composition as defined in claim 19 wherein said dialkyl phthalate plasticizer is selected from the group consisting of dioctyl phthalate and dibutyl phthalate.

* * * * *